Patented Dec. 15, 1953

2,662,818

UNITED STATES PATENT OFFICE 2,662,818

AMMUNITION PRIMING COMPOSITION AND PROCESS FOR PRODUCING SAME

Alfons G. Schuricht, Alton, Ill., assignor to Olin Industries, Inc., East Alton, Ill., a corporation of Delaware No Drawing. Application October 21, 1949, Serial No. 122,868

5 Claims. (Cl. 52—4)

1

This invention relates to ammunition and more particularly to ammunition priming compositions and their manufacture.

Priming compositions and their explosive ingredients are generally handled in a water-wet state to minimize the hazard of the operation until they are loaded or charged into the cartridge heads or caps. After the composition, which is relatively insensitive due to the presence of the water has been charged into the cartridge heads or caps, it is dried and the powder, projectiles, etc. are assembled therewith in accordance with the customary practice to form the completed cartridges. The practice of including water with the ingredients and in the compositions through the charging operation has not, however, entirely prevented disastrous explosions with loss of life or limb. The reasons for such premature explosions are probably multitudinous, but ranking high among them is the handling of ingredients or compositions in a too dry state.

If too much water is present in the mix there may be a tendency for the ingredients to settle out, forming a relatively dry hard cake in the bottom of the storage vessel which occasionally explodes during removal from the vessel. On the other hand, if too little water is employed in order to avoid settling during storage prior to charging, the composition may be so sensitive as to explode during the normal mixing and charging operations. Furthermore, some of the ingredients may require for safe handling the presence of so much water that when mixed with the other ingredients the composition tends to settle or is just on the borderline of having too much water present. Some priming composition ingredients require for safe handling more water than others, depending among other things on the chemical composition and particle size. In order that the priming composition can be utilized in the handling and charging equipment extant in the ammunition industry it must, of course, have the required physical consistency regardless of composition. Water content and ingredient particle size are prime factors in determining such consistency. The requirement of just enough but not too much water in such operations with some compositions presents a plaguing problem indeed in view of the explosive hazard involved.

It is therefore an object of this invention to provide priming compositions which can be handled with greater safety than prior compositions. Another object is to provide a process of manufacturing priming compositions in which the likelihood of premature explosions is greatly minimized. Still another object is to provide priming compositions having improved charging characteristics. It has been found in accordance with this invention that the foregoing objects and advantages can be accomplished by including in the priming composition a relatively small amount of an aerogel. When the aerogel is included in the wet priming composition more water can be tolerated therein without any settling out of the ingredients during the period prior to the ammunition loading operation. This permits the initiating explosive ingredients to be handled individually in greater quantities of water thereby greatly minimizing the possibility of premature explosion of the ingredients and the composition. Furthermore the wet priming composition containing the aerogel has improved charging characteristics, such as less tendency to adhere to the charging apparatus and smoother flow so as to facilitate more accurate charging.

Numerous aerogels can be prepared, such as the aerogels of silica, alumina, magnesia, nickel hydroxide, thoria, titania, stannic oxide, chromic oxide, albumin, cellulose, collodion, gelatine, and the like. Such aerogels may be prepared in accordance with the process described in U. S. Patent 2,093,454 issued to Kistler, September 21, 1937, and the aerogel of silica is sold commercially under the trade-name "Santocel." The aerogel is preferably reduced to a powder prior to incorporation with the explosives and an average particle size of only a few microns is preferred for optimum effectiveness. In general the greater the amount of aerogel included in the composition, the greater the amount of water permissible in the composition without settling out of ingredients. Less aerogel than about 0.1% by weight of the priming composition is usually insufficient to materially increase the amount of water permissible therein, whereas amounts as high as 5% by weight of the composition are seldom needed to permit sufficient water in the composition. Because of its bulking effect, a large amount of the aerogel in the composition will prevent sufficient explosive from being charged into the limited space of the primer cavity of the round of ammunition. The optimum amount of aerogel within the range of 0.1% to 5.0% to be used in the composition will depend upon the type of explosive ingredients, their sensitivity, particle size, etc., and the porosity and particle size of the aerogel. However, about 0.5% to 3.0% may be used in practically all such compositions to good advantage to permit more water to be used with the ingredients and in the mixture.

Having thus described the invention in a general way, further objects and advantages may become apparent from the following detail description of specific embodiments illustrating the invention.

A priming mixture suitable for use in rimfire cartridges may be formed by mixing the following ingredients in about the following proportions:

| | Per cent |
|---|---|
| Complex salt composed of one mol each of lead styphnate, basic lead styphnate and lead hypophosphite prepared in accordance with U. S. 2,292,956 | 48.5 |
| Tetracene | 5.0 |
| Diazodinitrophenol | 7.0 |
| Lead nitrate | 19.0 |
| Ground glass | 19.0 |
| Gum arabic | 1.0 |
| Aerogel | 0.5 |

Although specific amounts of the ingredients are set forth above, it will be understood that the proportions may be varied as is known in the art to improve the efficiency of ignition of various types of propellant powders and regulate the sensitivity of the composition. For instance, depending upon the characteristics desired, the proportions of constituents may be varied within ranges such as 46% to 52% of the above-identified complex salt, 0.5% to 6.0% tetracene, 5% to 12% diazodinitrophenol, 15% to 25% lead nitrate, 15% to 25% ground glass, 0.5% to 2.0% gum arabic, and 0.1% to 3% aerogel. In preparing the composition the water-wet complex salt and tetracene are first mixed together, the solids content being about 78.5%. The water-wet diazodinitrophenol containing 65% solids is then incorporated into the mixture. The remainder of the ingredients are dry and are mixed together and screened through a standard U. S. 28 mesh sieve prior to incorporation with the wet explosives. The mixing of the wet with the dry ingredients is done in a Werner-Pleiderer Sigma-blade mixer until the composition is homogeneous which usually takes about 30 minutes. The composition is then placed in a suitable container until it is loaded into the rounds of ammunition. The solids content of the water-primer mixture is about 83.3% and no settling of the composition occurs. If aerogel is omitted from the composition it is necessary to maintain the solids content of the composition at about 84.3% or greater in order to minimize the settling out phenomena and even with this increased solids content settling out occassionally occurs introducing hazard into the operation. In the absence of the aerogel and in order to get a composition solids content of 84.3%, in order to have the proper charging consistency, it is necessary to reduce the amount of water added with the diazodinitrophenol so that the diazodinitrophenol-water mixture contains 82% solids. A diazodinitrophenol-water mixture containing 82% solids can only be obtained practically by filtering off the excess water with the aid of vacuum, which operation is occasionally dangerous because local dry spots occasionally result and because the handling of diazodinitrophenol at 82% solids content is considered dangerous. The table below illustrates the effect of water content on the sensitivity of diazodinitrophenol.

*Water-diazodinitrophenol mixture*

| Diazodinitrophenol, Percent | Water, Percent | Percent Wet Mix Detonated by Equal Quantity of Dry Mix |
|---|---|---|
| 65 | 35 | 0 |
| 72 | 28 | 0 |
| 75 | 25 | 47 |
| 79 | 21 | 75 |
| 96 | 4 | 91 |
| 100 | 0 | 100 |

From the foregoing it will be noted a diazodinitrophenol-water mixture containing 72% or less diazodinitrophenol is relatively insensitive whereas such a mixture containing 75% or greater diazodinitrophenol is hazardous to handle. The advantage of including the aerogel in such a composition is apparent when it is observed that a diazodinitrophenol-water mixture containing 65% solids can not be detonated with an equal quantity of dry diazodinitrophenol while a diazodinitrophenol-water mixture containing 82% solids, which it is necessary to handle if the aerogel is not used, is detonated to the extent of greater than 75% of the wet diazodinitrophenol by an equal weight of dry diazodinitrophenol.

The aerogel used in the above composition is sold commercially under the trade-name "Santocel C" and is an aerogel of silica containing about 89.5%–91.5% $SiO_2$, about 2.5%–3.5% sodium sulfate, about 1% aluminum oxide and iron oxide, and about 4.0%–6.0% of volatile material, has a dry bulk density of about 6 pounds per cu. ft., and a typical particle size of about 3 to 5 microns in diameter. The aerogel in this composition has no effect on the impact sensitivity of either the wet composition prior to charging or after loading and drying in the ammunition components.

One method of loading priming compositions into shells involves the use of a plate with a plurality of holes therein filled with the priming composition, the volume of each hole being such as to give the proper volume of priming composition for the particular shell or primer cap to be charged. Empty shells or caps are placed under the filled holes and appropriate knock-out pins are passed through the holes to force the pellets of the priming composition formed in each hole out of the hole so that the pellets fall into the shells or caps thereunder. With prior compositions it is not unusual for the composition to be so tacky as to adhere to the end of the knock-out pins and result in some shells containing no priming compositions and in others containing a double portion. It has been observed that a priming composition containing an initiating explosive and aerogel prepared as in the foregoing has no tendency to adhere to the knock-out pins and results thereby in a much more dependable charging operation. The holes in the charger plate are filled by rubbing the composition into the holes while the plate is placed on a table or other similar flat surface, the excess composition being rubbed or removed from the upper surface of the plate. Some prior priming compositions tend to be so tacky as to make filling of the holes difficult and to cause portions of the composition to be removed from the holes when the excess composition is removed from the surface of the plate. Compositions containing aerogel as in the foregoing show no such tendency and greatly facilitate this operation.

By way of another example following is a priming composition suitable for use in shot shell and other centerfire ammunition:

| | Per cent |
|---|---|
| Lead styphnate | 40 |
| Tetracene | 5 |
| Pentaerythritol | 4 |
| Antimony sulfide | 16 |
| Barium nitrate | 30 |
| Aluminum (powdered) | 4.5 |
| Aerogel | 0.5 |

As pointed out hereinbefore, the specific proportions may be varied in accordance with known practice to vary sensitivity and ignition efficiency of the composition. Ordinarily, in the absence of aerogel this composition must be charged at a solids content of about 85.4%. By including 0.5% aerogel as described in the foregoing, it was possible to increase the water content of the composition to a solids content of 83.3%, thus, permitting the explosive ingredients to be handled in a materially greater amount of water with the resultant increased safety. The aerogel in such compositions does not in any way detract from the sensitivity or stability of the composition. When it is attempted to use a finely sub-divided inert ingredient other than such aerogel, it has been found that such ingredients almost invariably effect either the combustion rate or the sensitivity of the composition. For instance, when a substance such as bentonite is substituted in equal amount for the aerogel, the settling out of the ingredients of the composition prior to charging is not prevented and the sensitivity of the composition is materially lowered.

In incorporating aerogel into this priming composition in accordance with this invention, it will be apparent that only that amount need be added that is required to permit the desired quantity of water to be used. Since the quantity of water that can be included in wet priming mixes is limited by the settling out phenomena and by the required consistency of the mixture for charging purposes, the aerogel effects a very advantageous function in permitting greater than usual quantities of water to be utilized with the explosive ingredients and in the priming compositions. As pointed out hereinbefore, in addition to increasing the safety in handling of such explosives, the aerogel also improves the charging characteristics of the compositions. The desired objectives and advantages have thus been accomplished in accordance with this invention.

Although, the specific embodiments are described in the foregoing with reference to particular ingredients, compositions and the like, it will be apparent that this invention will be applicable to all priming compositions which involve the problem of having sufficient water present to enable safe handling. It is to be understood, therefore, that the embodiments of the present invention as shown and described are only illustrative and that many changes may be made therein without departing from the spirit and scope of this invention as set forth in the following claims.

Having thus described the invention what is claimed and desired to be secured by Letters Patent is:

1. In the manufacture of ammunition priming compositions by water-wet mixing of ingredients, the method which comprises including from about 0.1% to about 5.0% of an aerogel in the water-wet mixture.

2. In the manufacture of ammunition priming compositions by water-wet mixing of ingredients, the method of improving the charging characteristics of the water-wet mixture and increasing the safety of handling same which comprises including in said composition 0.1% to 5.0% silica aerogel.

3. A priming composition comprising an initiating explosive and about 0.1% to 5.0% of silica aerogel.

4. A priming composition comprising an initiating explosive and 0.1% to 5.0% silica aerogel having an average particle size diameter of about 3 to 5 microns.

5. A priming composition comprising an initiating explosive and 0.1% to 5.0% of an aerogel.

ALFONS G. SCHURICHT.

References Cited in the file of this patent

UNITED STATES PATENTS

| Number | Name | Date |
|---|---|---|
| 1,772,695 | Wulff | Aug. 12, 1930 |
| 2,257,545 | Curtis | Sept. 30, 1941 |
| 2,411,070 | Van Karner | Nov. 12, 1946 |

FOREIGN PATENTS

| Number | Country | Date |
|---|---|---|
| 537,579 | Great Britain | June 27, 1941 |